United States Patent [19]

Shimaoka

[11] 4,437,132
[45] Mar. 13, 1984

[54] FLEXIBLE MAGNETIC DISK DEVICE

[75] Inventor: Motohiro Shimaoka, Furukawa, Japan

[73] Assignee: Alps Electric Co., Ltd., Tokyo, Japan

[21] Appl. No.: 308,895

[22] Filed: Oct. 5, 1981

[30] Foreign Application Priority Data

Oct. 7, 1980 [JP] Japan .............................. 55-142220[U]

[51] Int. Cl.³ ............................................... G11B 5/48
[52] U.S. Cl. ..................................... 360/105; 360/99; 360/130.34
[58] Field of Search ............... 360/102, 103, 105, 106, 360/130.3, 130.34, 99

[56] References Cited

U.S. PATENT DOCUMENTS

| | | | |
|---|---|---|---|
| 3,990,111 | 11/1976 | Elliott | 360/99 |
| 4,040,106 | 8/1977 | Medley | 360/99 |
| 4,380,783 | 4/1983 | Adamek et al. | 360/99 |
| 4,392,165 | 7/1983 | Wright | 360/105 |

FOREIGN PATENT DOCUMENTS 2067000  7/1981  United Kingdom .................. 360/99

*Primary Examiner*—George G. Stellar
*Attorney, Agent, or Firm*—Guy W. Shoup; Gerard F. Dunne

[57] ABSTRACT

A flexible magnetic disk device in which a solenoid is disposed in parallel with the surface of a magnetic disk, and a supporting arm to be turned perpendicularly to the disk surface by the solenoid is juxtaposed to the disk surface, whereby the magnetic disk device can be thinned.

3 Claims, 6 Drawing Figures

FLEXIBLE MAGNETIC DISK DEVICE

BACKGROUND OF THE INVENTION

The present invention relates to a flexible magnetic disk device, and more particularly to a head loading mechanism in a flexible magnetic disk device.

A flexible magnetic disk device has such advantages that the custody space is small, that the reuse is possible and that the performance is high. It is therefore becoming indispensable as a storage device for the peripheral unit of a microcomputer, etc. Regarding magnetic disks, ones of smaller sizes are coming into wide use. It is accordingly desired to miniaturize the magnetic disk device for loading and driving the magnetic disk.

In the prior-art flexible magnetic disk device, however, a solenoid in a head loading mechanism is mounted on a base plate in the so-called vertical fashion, and a supporting arm which is driven by the solenoid is disposed right over the solenoid in correspondence with the pole face of the solenoid, so that the flexible magnetic disk device cannot be thinned satisfactorily.

SUMMARY OF THE INVENTION

An object of the present invention is to provide a flexible magnetic disk device which can be thinned.

According to one aspect of performance of the present invention, a flexible magnetic disk device wherein a magnetic head and a loading pad opposing to the magnetic head are disposed in a manner to hold therebetween a magnetic disk loaded rotatably and to be movable radially of the magnetic disk and wherein the loading pad has its operation controlled by a supporting arm which is turned by a solenoid a prescribed amount within a plane perpendicular to the surface of the magnetic disk is characterized in that the solenoid is disposed with its axis being substantially parallel to the surface of the magnetic disk and that the supporting arm is juxtaposed to the disk surface along with the solenoid.

DETAILED DESCRIPTION OF THE INVENTION

Figure 1:
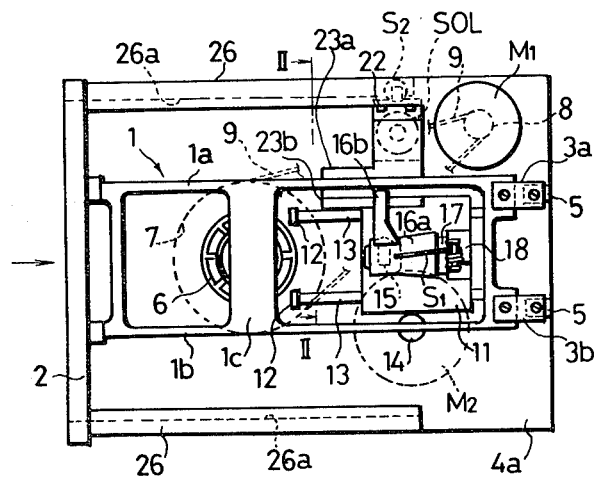
FIG. 1 is a plan view showing a prior-art flexible magnetic disk device.

A prior-art flexible magnetic disk device is, for example, as shown in FIG. 1.

First, there will be described a mechanism for loading a magnetic disk and a mechanism for rotating it. In the figure, numeral 1 designates a rectangular frame. On the side of a front panel 2 in the frame 1, a door mechanism not shown is mounted. The rear end part of the frame opposite to the door mechanism is attached to supporting posts 5 and 5 erected on a base plate 4a, through hinge portions 3a and 3b formed of leaf springs.

The frame 1 can have the other end side turned out of the sheet of the drawing a prescribed amount about the hinge portions 3a and 3b, and the door is opened by the turning operation.

In substantially the central part of the frame 1, a collet mounting member 1c is extended across both side members 1a and 1b, and a tapered collet 6 is rotatably mounted on the collet mounting member 1c by a shaft. On the side of the base plate 4a opposing to the tapered collet 6, a spindle not shown is disposed. A rotary shaft in the spindle is protruded onto the rear surface side of the base plate 4a, and a driven pulley 7 is fastened to the protruded part.

On the other hand, symbol $M_1$ represents a rotation driving motor, and a belt 9 is extended between a driving pulley 8 on the side of the rotation driving motor $M_1$ and the driven pulley 7.

Now, a head loading mechanism will be described by referring also to FIG. 2.

Numeral 11 indicates a block-shaped carriage. The guide holes are provided in parallel in the carriage 11, and guide rods 13 and 13 juxtaposed on the base plate 4a through appropriate supporting members 12 and 12 are slidably inserted through the guide holes.

A roller 14 mounted on the output shaft of a stepping motor $M_2$ is held in engagement with one side surface of the carriage 11 through a belt (not shown).

A writing and reading magnetic head H is fixed to the carriage 11, and a loading pad 15 made of felt or the like is disposed in opposition to the magnetic head H.

The loading pad 15 is mounted on a head loading arm 16a, an end part of which is attached to a supporting post 18 erected on the carriage 11 through a hinge portion 17 formed of a leaf spring. Symbol $S_1$ represents a bias spring formed of a wire spring, the elastic force of which gives the head loading arm 16a a turning trend in the direction of normally holding the loading pad 15 in opposed contact with the magnetic head H.

Figure 2:
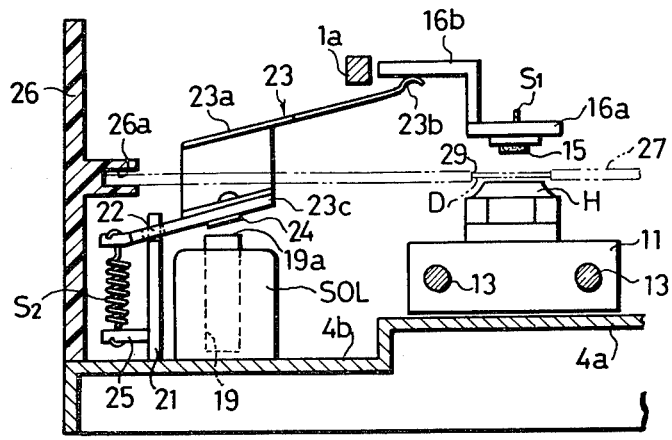
FIG. 2 is an enlarged sectional view taken along line II—II in FIG. 1.

Near that part of the head loading arm 16a on which the loading pad 15 is mounted, a hook-shaped auxiliary arm 16b is mounted in a manner to extend out laterally (leftwards as viewed in FIG. 2).

On the other hand, a solenoid SOL is mounted on a base-plate step portion 4b which is formed to be lower than the plane of the base plate 4a.

The solenoid SOL is mounted in the sense in which a pole face 19a is located on the upper side as viewed in FIG. 2, that is, in the sense in which the axis of a core 19 in the solenoid SOL intersects orthogonally to the plane of a magnetic disk D to be loaded as will be stated later.

A supporting plate 21 is erected on that side part of the base-plate step portion 4b which is opposite to the magnetic head H with respect to the position of the solenoid SOL. A supporting arm-mounting plate 23c is rockably attached to the upper end part of the supporting plate 21 through a hinge portion 22.

The supporting arm-mounting plate 23c is located above the core 19 or right over the solenoid SOL, and has a magnetic piece 24 secured to its part opposing to the pole face 19a.

On the upper surface of the mounting plate 23c opposite to the surface thereof to which the magnetic piece 24 is secured, a supporting arm body 23a is mounted. A supporting arm 23 is constructed with its principal constituents being the supporting arm body 23a and the supporting arm-mounting plate 23c.

When viewed from the right side of FIG. 2, the supporting arm body 23a is bent substantially in the shape of letter U turned sideways. The upper piece formed by the bending extends out to the rear surface part of the auxiliary arm 16b. At the end part extending out, a projection whose section is semicircular is provided by a protruding work, thereby to form an abutting portion 23b.

The abutting portion 23b is formed so as to have a required length in parallel with the guide rod 13 when viewed in plan as illustrated in FIG. 1. The "required length" is a length somewhat greater than the moving stroke of the auxiliary arm 16b and enough to always support the auxiliary arm 16b whichever position within the moving stroke this arm has moved to.

At the rear part of the supporting arm-mounting plate 23c, a coiled spring $S_2$ is extended between it and a spring retaining portion 25. Owing to the elastic force of the coiled spring $S_2$, the supporting arm 25 is normally given a turning trend in the counterclockwise direction. The head loading arm 16a is raised to its unloading position and supported by the abutting portion 23b.

By the way, the turning limit of the supporting arm 23 in the counterclockwise direction is controlled by the structure of the hinge portion 22.

Numeral 26 indicates each side plate, which is provided with a cartridge guide groove 26a.

Figure 3:
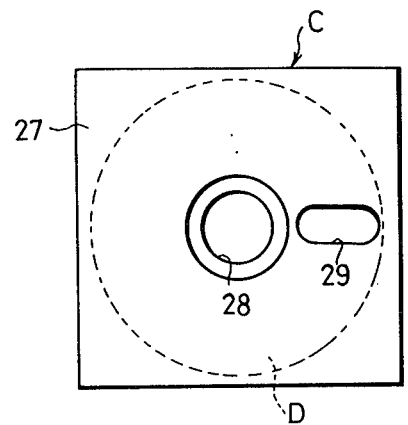
FIG. 3 is a plan view showing a disk cartridge which is applied to the device of FIG. 1.

FIG. 3 shows a disk cartridge C which is loaded in the flexible magnetic disk device constructed as stated above. The flexible magnetic disk D is turnably received in a jacket 27 made of polyvinyl chloride or the like. Numeral 28 indicates a center hole which is provided in the central part of the magnetic disk D, and numeral 29 a head window which is opened in the jacket 27.

In the state in which the door of the flexible magnetic disk device is open, the disk cartridge C is pushed in along the cartridge guide grooves 26a. It is inserted into a predetermined position, and the door is closed. Then, the center hole part 28 is supported and fixed between the tapered collet 6 and the spindle, and the magnetic disk D is rotatably loaded in the device. At this time, the head window 29 is located between the magnetic head H and the loading pad 15 as shown in FIG. 2. The magnetic disk D is rotated at 300 r.p.m. by the rotation driving motor $M_1$.

Subsequently, when the stepping motor $M_2$ is supplied with a required stepping pulse signal from a driver circuit not shown, it turns a predetermined amount. Thus, the carriage 11 is moved through the roller portion 14, and the magnetic head H is located over a predetermined track in the magnetic disk D.

Subsequently, when an exciting signal is applied to the solenoid SOL, the supporting arm 23 is turned clockwise against the elastic force of the coiled spring $S_2$. The support of the head loading arm 16a by the abutting portion 23b is released, the loading pad 15 is pressed against the surface of the magnetic disk D, and the magnetic head H is loaded on the surface of the magnetic disk D. At this time, the abutting portion 23b is separated slightly from the rear surface of the auxiliary arm 16b, and the pressing force of the magnetic head H against the magnetic disk D is generated by only the elastic force of the bias spring $S_1$.

After the loading as described above, data are appropriately written into or read out from the magnetic disk D.

The flexible magnetic disk device thus far described has a large number of advantages such as a small custody space, reusability and an excellent performance, over a device which employs a storage medium such as punch card. Therefore, it is recently becoming indispensable as a storage device for the peripheral equipment of a microcomputer, etc.

Regarding the sizes of the magnetic disks D, magnetic disks of the standard type of 8 inches, ones of a smaller size of 5¼ inches, etc. are coming into wide use. It is accordingly desired to make smaller the size of the magnetic disk device for loading and driving the magnetic disk.

In the prior-art flexible magnetic disk device, however, the solenoid SOL in the head loading mechanism is mounted on the base plate in the so-called vertical fashion, and further, the supporting arm 23 which is driven by the solenoid SOL is located right over the solenoid SOL in correspondence with the pole face thereof, so that the aspect of arrangement of the solenoid SOL etc. sets a limitation to the intention of thinning the magnetic device.

The present invention has been made with note taken of such problem of the prior art. According to the present invention, in a flexible magnetic disk device wherein a magnetic head and a loading pad opposing to the magnetic head are disposed in a manner to hold therebetween a magnetic disk loaded rotatably and to be movable radially of the magnetic disk and wherein the loading pad has its operation controlled by a supporting arm which is turned by a solenoid a prescribed amount within a plane perpendicular to the surface of the magnetic disk, the problem is solved in such a way that the solenoid is disposed with its axis being substantially parallel to the plane of the magnetic disk and that the supporting arm is juxtaposed to the disk plane along with the solenoid.

Hereunder, the present invention will be described with reference to the drawings.

Figure 4:
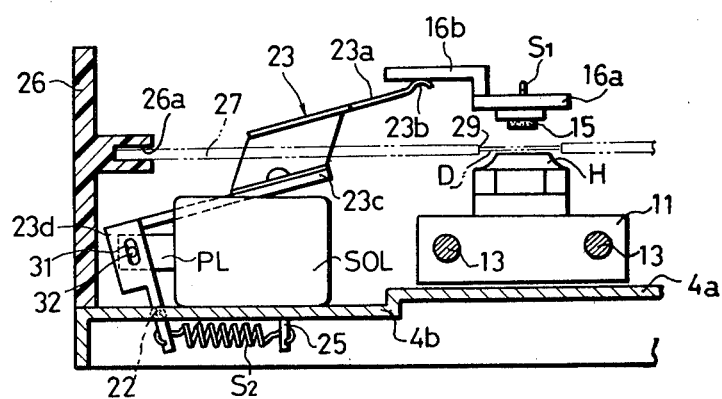
FIG. 4 is a sectional view similar to FIG. 2, showin an embodiment of a flexible magnetic disk device according to the present invention.
Figure 5:
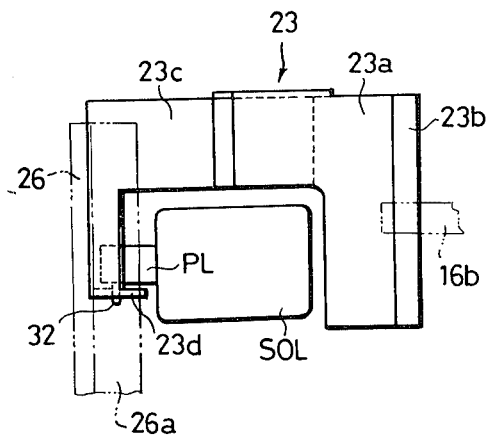
FIG. 5 is a partial plan view showing the arrangement relationship between a solenoid and a supporting arm in FIG. 4.
Figure 6:
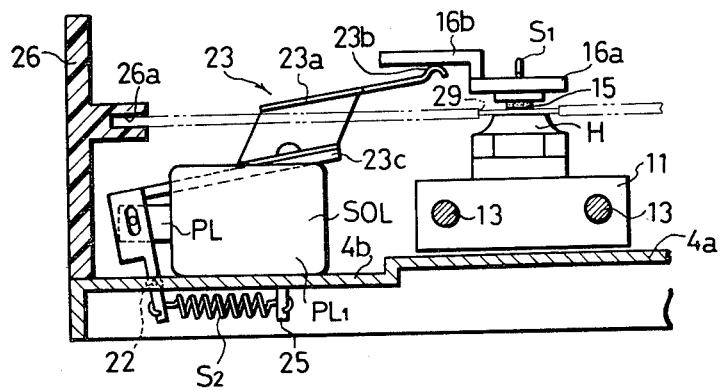
FIG. 6 is a sectional view similar to FIG. 2, showing the state in which a magnetic head is loaded in the device of FIG. 4.

In FIGS. 4 to 6, the same or equivalent members or portions as or to those in FIGS. 1 to 3 are indicated by the same numerals or symbols, and they will not be repeatedly explained.

FIGS. 4 and 5 are views showing an embodiment of the present invention.

First, the construction of the embodiment will be described. In the present invention, the solenoid SOL is mounted on the base-plate step portion 4b laterally, in other words, in the sense in which the axis of a plunger PL slidably disposed in the solenoid SOL is substantially parallel to the plane of the loaded magnetic disk D.

The supporting arm 23 which includes the supporting arm body 23a and the supporting arm-mounting plate 23c is formed substantially in the shape of letter U inverted when viewed in plan as illustrated in FIG. 5. The U-shaped supporting arm 23 is arranged by the side of the solenoid SOL in a manner to surround the solenoid SOL. That is, both the solenoid SOL and the supporting arm 23 are disposed in the positional relationship in which they are arrayed in the direction of the plane of the magnetic disk D with respect to this magnetic disk.

That part of the supporting arm-mounting plate 23c which extends out onto the side of the plunger PL has its end part bent downward in FIG. 4 so as to form a plunger mounting portion 23d. The plunger mounting portion 23d is provided with a slot 31, in which a pin 32 secured to the plunger rod PL is loosely fitted.

The plunger mounting portion 23d is further extended downwards. The part of the extension intersecting with the base-plate step portion 4b is provided with the hinge portion 22, and the part thereof protruding on the rear surface side of the base-plate step portion 4b has the coiled spring S₂ extended between it and the spring retaining portion 25. By the way, this coiled spring may well be extended between, for example, the rear surface part of the supporting arm body 23a (opposite to the abutting portion 23b) and the side plate 26.

Now, the operation of the embodiment will be described by referring also to FIG. 6.

When, in the state of FIG. 4, an exciting signal is applied to the solenoid SOL, the plunger PL is attracted, and the supporting arm 23 is turned clockwise a predetermined amount with its turning fulcrum at the hinge portion 22 by the side of the solenoid SOL. Upon this turning, the support of the head loading arm 16a by the abutting portion 23b is released, the loading pad 15 is pushed against the surface of the magnetic disk D, and the magnetic head H is loaded on the surface of the magnetic disk D as shown in FIG. 6.

The operation of loading the disk cartridge C into the flexible magnetic disk device, the operation of positioning the magnetic head H onto a predetermined track, etc. are the same as in the case of the prior art.

As described above in detail, according to the present invention, a flexible magnetic disk device wherein a magnetic head and a loading pad opposing to the magnetic head are disposed in a manner to hold therebetween a magnetic disk loaded rotatably and to be movable radially of the magnetic disk and wherein the loading pad has its operation controlled by a supporting arm which is turned by a solenoid a prescribed amount within a plane perpendicular to the surface of the magnetic disk is so constructed that the solenoid is disposed with its axis being substantially parallel to the surface of the magnetic disk and that the supporting arm is juxtaposed to the disk surface along with the solenoid. Therefore, the invention can achieve the effect in practical use that an aspect of disposition which is very suitable for thinning the flexible magnetic disk device can be realized.

I claim:

1. In a flexible magnetic disk device wherein a magnetic head and a loading pad opposing thereto are disposed on a carriage in a manner to hold therebetween a magnetic disk loaded rotatably and to be movable radially of the magnetic disk and wherein the loading pad has its operation cntrolled by a supporting arm which is turned by a solenoid a prescribed amount within a plane perpendicular to the surface of the magnetic disk;

the improvement in that said solenoid is disposed with its axis being substantially parallel to the surface of said magnetic disk and that said supporting arm is juxtaposed to the disk surface along with said solenoid.

2. A flexible magnetic disk device according to claim 1, wherein a plunger of said solenoid is protruded on a side opposite to said carriage, and said plunger is connected to a plunger mounting portion which is bent downwards from a supporting arm-mounting plate of said supporting arm.

3. A flexible magnetic disk device according to claim 1, wherein said supporting arm is located so as to surround said solenoid.

* * * * *